Feb. 21, 1928. 1,659,848
E. H. WILSON
FEEDING AND DISCHARGING MECHANISM FOR METAL WORKING APPARATUS
Filed March 12, 1924 3 Sheets-Sheet 2
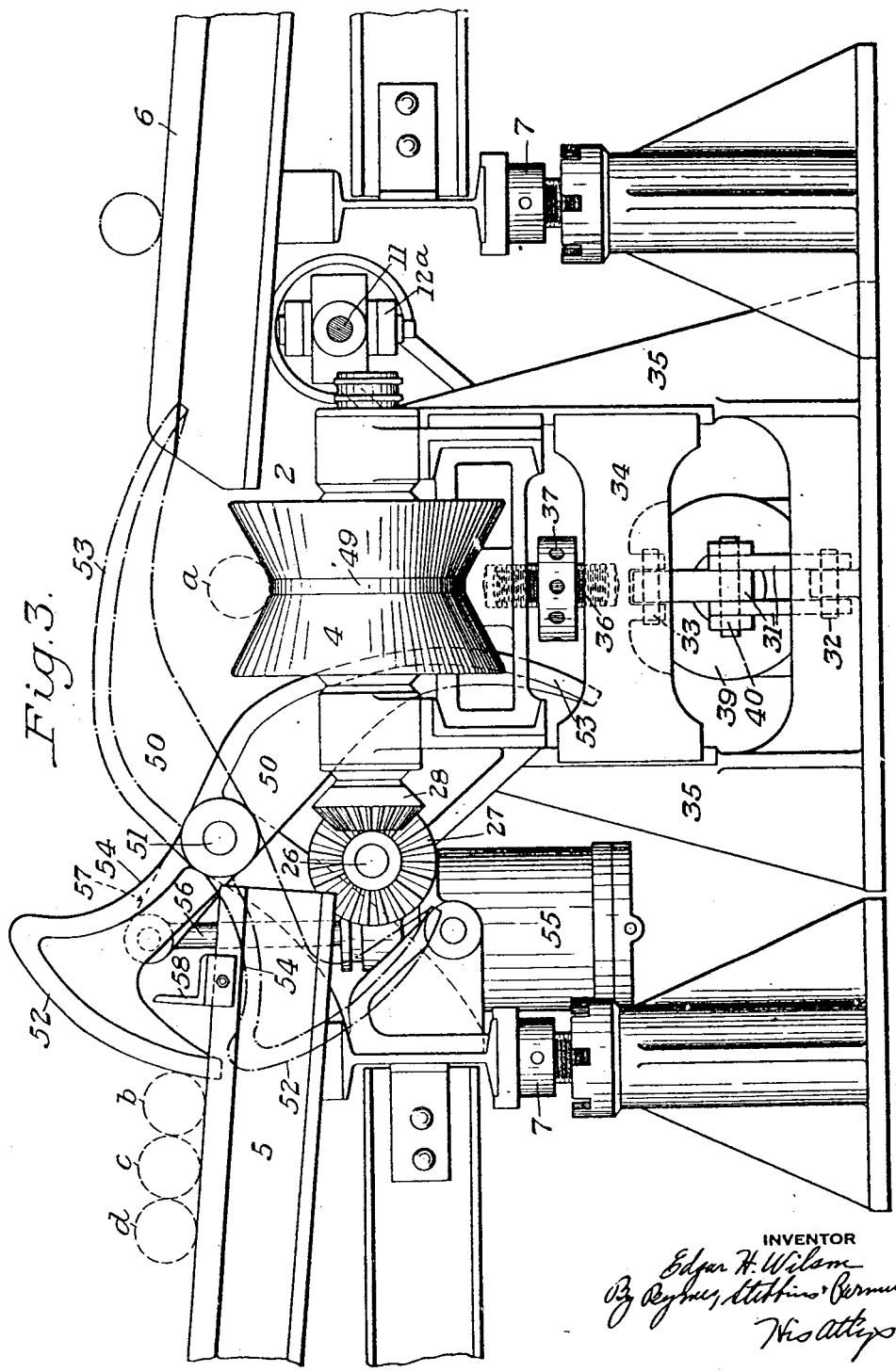
INVENTOR
Edgar H. Wilson Feb. 21, 1928.

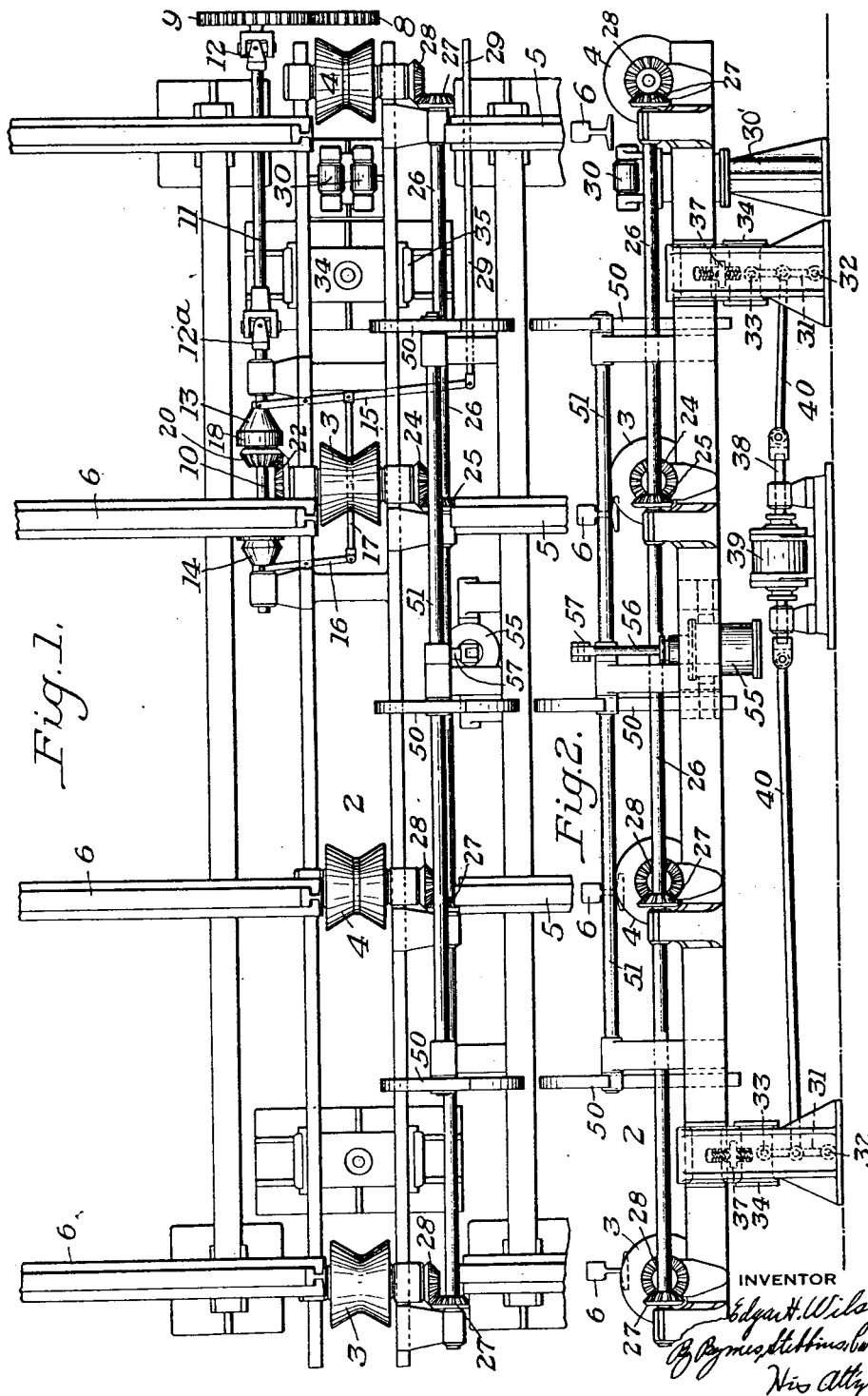

E. H. WILSON 1,659,848

FEEDING AND DISCHARGING MECHANISM FOR METAL WORKING APPARATUS

Filed March 12, 1924     3 Sheets-Sheet 3

INVENTOR
Edgar H. Wilson
By Byrnes, Stebbins & Parmelee
His Attys

Patented Feb. 21, 1928.

1,659,848

UNITED STATES PATENT OFFICE.

EDGAR H. WILSON, OF STOWE TOWNSHIP, ALLEGHENY COUNTY, PENNSYLVANIA, ASSIGNOR TO TAYLOR-WILSON MANUFACTURING COMPANY, OF McKEES ROCKS, PENNSYLVANIA, A CORPORATION OF PENNSYLVANIA.

FEEDING AND DISCHARGING MECHANISM FOR METAL-WORKING APPARATUS.

Application filed March 12, 1924. Serial No. 698,702.

The present invention relates broadly to the metal working art, and more particularly to feeding and discharging mechanism for pipe threading machines.

In threading pipe it is customary to take the pipes from a supply rack and place them one at a time in the barrel of the pipe threading machine and thread the same, and then place the threaded pipes on a receiving rack.

By the present invention there is provided a mechanism for effecting the above operations which is entirely automatic in operation and substantially eliminates and manual handling of the pipes. While the mechanism is particularly adapted for the purpose set forth, its use is not limited in this respect, as it may be employed for handling pipes, rods, and the like, in connection with any of the usual finishing operations to be performed thereon.

In the accompanying drawings, there is shown, for purposes of illustration only, one embodiment of the present invention, it being understood that the drawings do not define the limits of the invention, as changes may be made in the construction and operation therein disclosed without departing from the spirit of the invention or scope of my broader claims.

In the drawings:

Figure 1 is a plan view of a feeding and discharging mechanism embodying my invention;

Figure 2 is a view in side elevation of the mechanism shown in Figure 1;

Figure 3 is an end elevation of the mechanism shown in Figure 1 with certain parts removed for clearer illustration;

Figure 4:
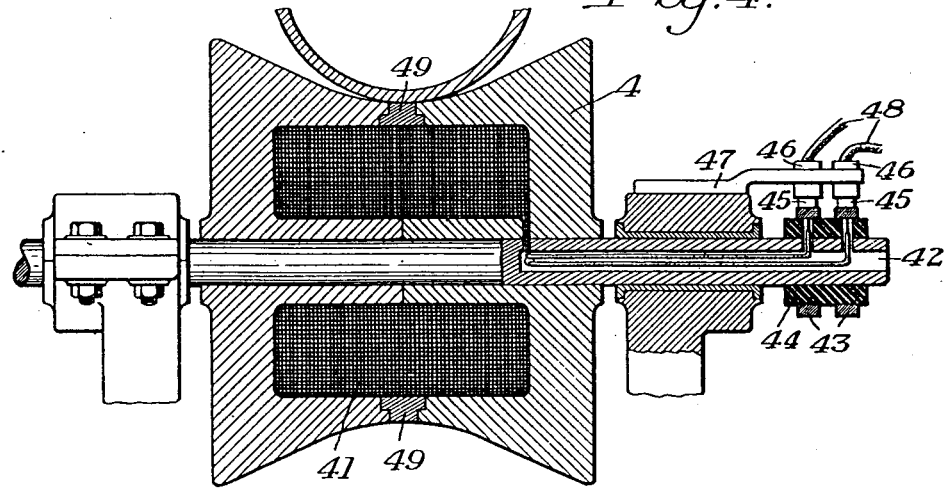
Figure 4 is a detail sectional view of one of the magnetic rollers.

Referring to Figures 1, 2 and 3, the reference numeral 2 designates a roller table which carries any suitable number of transverse rollers 3 and 4, the rollers 3 being non-magnetic and the rollers 4 magnetic for a purpose which will be hereinafter explained. At one side of the roller table is positioned an inclined pipe supply rack 5 upon which the pipes to be threaded are placed and at the opposite side of the roller table is positioned an inclined rack 6 for receiving the threaded pipes. These racks have screw jacks 7 associated therewith, whereby the ends of the racks adjacent the roller table may be vertically adjusted.

Each of the rollers 3 and 4 has a V-shaped peripheral surface and these rollers are adapted, when rotated in one direction, to move a pipe supported thereby, as indicated in dotted lines in Figure 3, into the barrel of a pipe threading machine. Referring to Figure 1, the reference numeral 8 indicates a ring gear on the end of the barrel (not shown). This gear meshes with a gear 9 which drives a clutch shaft 10 through a coupling shaft section 11 coupled to the shaft 10 and gear 9 through universal joints 12 and 12$^a$.

Figure 5:
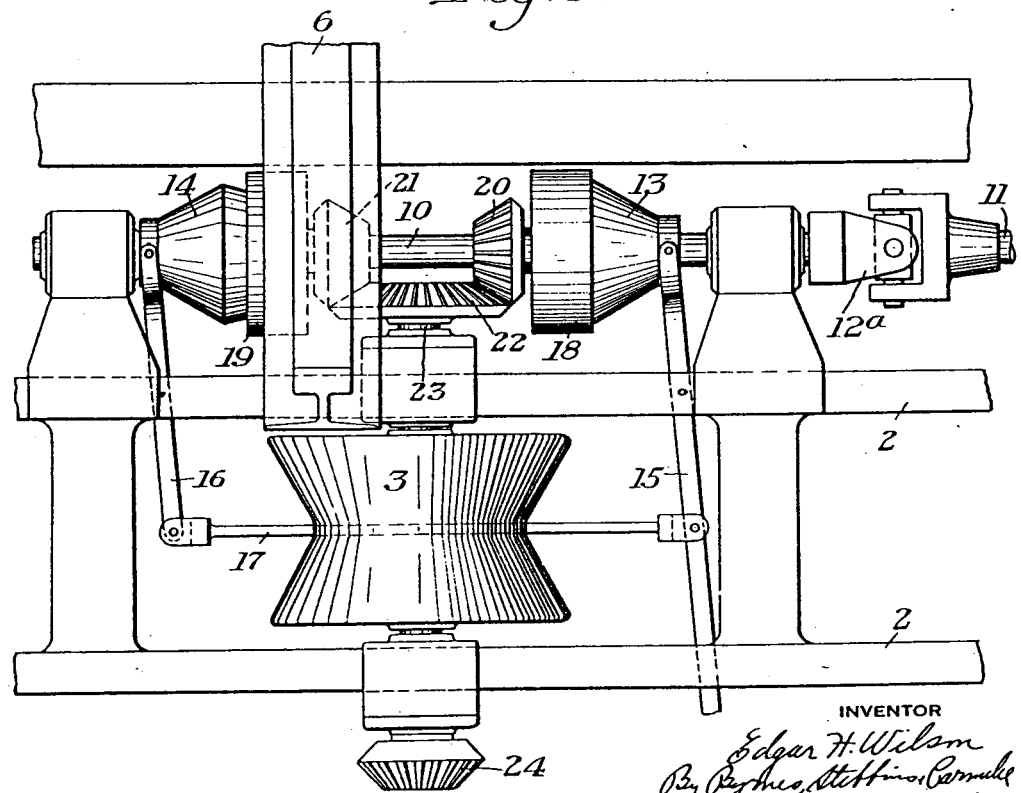
Figure 5 is a detail view illustrating the clutch mechanism for controlling the direction of rotation of the rollers.

Referring to Figure 5, the clutch shaft 10 has mounted thereon a pair of cone clutches 13 and 14 interconnected through levers 15 and 16 and a link 17 for simultaneous operation. The clutch 13 is adapted to cooperate with a clutch member 18 and the clutch 14 with a clutch member 19, both of said clutch members being freely rotatable upon the shaft 10. The clutch member 18 carries a bevel pinion 20 and the clutch member 19 a bevel pinion 21, both of said bevel pinions meshing with a bevel gear 22 on one end of the spindle 23 of one of the rollers 3. Said spindle has a bevel pinion 24 on its opposite end meshing with a bevel pinion 25 on a shaft 26 extending parallel with the roller table at one side thereof. The shaft 26 carries other bevel pinions 27 meshing with bevel pinions 28 on the spindles of the other rollers 3 and 4. It will be apparent that the rollers 3 and 4 may be driven in one direction or the other from the rotating barrel of the pipe threading machine through the operative connections just described.

The lever 15 is pivotally connected to one end of a rod 29. This rod is connected to a suitable operating handle on the pipe threading machine, whereby the operator may shift the clutch 13 into operative engagement with the clutch member 18 and simultaneously shift the clutch 14 out of operative engagement with the clutch member 19, and vice versa, to effect rotation of the rollers 3 and 4 in the desired direction.

Adjacent the forward end of the roller table 2 is a pair of longitudinally extending rollers 30 supported on the upper end of a plunger working in a vertical fluid pressure cylinder 30′. These rollers are adapted to support a pipe after it has been positioned in the barrel of the pipe threading machine and while it is being rotated by said machine during the threading operation. It will be apparent that in working with pipes of different diameters, the stroke of the plunger in the cylinder 30′ may be varied to properly align the pipe supported by the rollers with the axis of the barrel of the threading machine. The roller table 2 has means associated therewith for raising and lowering the same. When the table is in a raised position, the rollers 30 are in the lowered position, so that a pipe supported by the rollers 3 and 4 is slightly above the rollers 30. When the table is in lowered position, the rollers 30 are in their raised position, so that the pipe is then supported by said rollers. The means for raising and lowering the roller table comprises a pair of vertically extending toggles 31 adjacent opposite ends of the table, each of said toggles being pivoted at its lower end upon a stationary pivot 32 and at its upper end upon a pin 33 carried by a crosshead 34. The crossheads 34 slidably engage at their opposite ends vertical guides 35. Each of these crossheads is adjustably connected with the roller table by means of an adjusting screw 36 provided with a plurality of openings 37 adapted to receive a suitable tool for turning the same, whereby to adjust the position of the roller table. In this manner it is possible to so position the rollers 3 and 4 that the axis of the pipe supported thereby will substantially coincide with the axis of the barrel of the threading machine when the table 2 is in raised position. The toggles are connected with the opposite ends of the piston rods 38 of a piston working in a fluid pressure cylinder 39 by means of links 40. It will be apparent, by reference to Figure 1, that when the piston rod 38 is moved to the left, the toggles 31 will be broken and the roller table lowered, whereas when the piston rod is in the position shown the toggles will be straightened and the roller table held in raised position. The fluid pressure cylinders 30′ and 39 are preferably arranged to be controlled in such manner that when the table 2 is raised, the rollers 30 are simultaneously lowered, and vice versa.

Referring to Figure 4, each of the magnetic rollers 4 is formed hollow to receive a magnetic coil 41. The ends of the coil are brought out through a bore 42 in one end portion of the roller spindle and are secured to slip rings 43 carried by an insulating bushing 44 mounted on said spindle. These slip rings are engaged by brushes 45 mounted in holders 46 carried by a bracket 47. The holders 46 are connected to conductors 48 leading to a source of current supply. Preferably a controller (not shown) is positioned in the circuit of the coils 41 and connected to the means for operating the clutches 13 and 14 to be operated thereby in such manner that when the clutches are in neutral position, the coils will be deenergized, but will be energized when the clutches are moved in either direction from their neutral position to effect rotation of the rollers 3 and 4 in either direction. The magnetic rollers are formed of cast steel with a .2 to .3 carbon finish all over. Each of these rollers is made in two parts, in order to facilitate the placing of the magnetic coil 41 therein and comprises in its construction a ring 49 of non-magnetic material, which forms the lowest portion of its V-shaped peripheral surface and substantially the only portion of such surface which is engaged by a pipe when positioned on the rollers, as shown in Figure 4, because the curvature of the pipe supported by the rollers is usually considerably greater than the transverse curvature of the peripheral surface of the rollers. The purpose of embodying a non-magnetic ring in the construction of each magnetic roller 4 is to form an air gap in the magnetic circuit of each roller and cause the lines of magnetic force to pass from each roller through the pipe, thereby creating a strong magnetic attraction of the rollers for the pipe.

The supply rack 5 has means associated therewith for transferring the pipes, one at a time, from said supply rack onto the rollers 3 and 4 of the roller table and from these rollers onto the receiving rack 6. This transfer means comprises a plurality of rocker arms 50 carried by a rock shaft 51 extending parallel to and above the shaft 26. Referring to Figure 3, each rocker arm has a curved end portion 52 forming a stop for engagement with a pipe on the supply rack 5 and an opposite curved end portion 53 for engaging a pipe supported on the rollers 3 and 4 and transferring the same onto the receiving table 6 and a curved intermediate portion 54 for transferring a pipe from the supply rack onto the rollers 3 and 4. The rocker arms are adapted to be rocked from the full line into the dotted line position thereof shown in Figure 3, and vice versa, by means of a fluid pressure cylinder 55, the piston rod 56 of which is connected to a rocker arm 57 on the rock shaft 51.

The operation of the feeding and charging mechanism above described is as follows: Assuming that the roller table 2 is in its raised position and that a threaded pipe $a$ is supported on the rollers 3 and 4 thereof, as shown in Figure 3, and that the rocker arms 50 are in the full line position, shown in said figure, pressure fluid will be admitted to the fluid pressure cylinder 55 to first rock the rocker arms 50 from the full line position into the dotted line position, and then from the dotted line position back into the full line position. When the rocker arms are rocked from the full line position into the dotted line position, the pipe *a* supported on the rollers 3 and 4 will be engaged by the curved end portions 53 of said rocker arms and transferred onto the receiving rack 6. At the same time the pipe *b* on the supply rack 5 will be permitted to roll into engagement with the adjustable stops 58 on said rack, the other pipes *c*, *d*, etc., following on behind the pipe *b*. Upon movement of the rocker arms from the dotted line position into the full line position, the pipe *b*, which is in engagement with the stops 58, will be raised from the supply rack 5 by the curved intermediate portions 54 of the rocker arms and transferred onto the rollers 3 and 4. The magnetic rollers 4 will hold the pipe in central position on the rollers 3 and 4, as illustrated in Figure 4, when the magnetic coils 41 are energized. The operator will now actuate the clutches 13 and 14 through the rod 29 to effect rotation of the rollers 3 and 4 in a direction to move the pipe supported thereby into the barrel of the threading machine. As soon as the pipe has been inserted in said barrel, the clutches 13 and 14 will be moved to neutral position to stop rotation of the rollers 3 and 4, and pressure fluid will be admitted to the fluid pressure cylinders 30' and 39. Fluid admitted to the cylinder 39 will move the piston 38 to the left and thereby effect lowering of the roller table, while fluid admitted to the cylinder 30' will raise the rollers 30 into position to engage and support the pipe. The roller table will remain in the lowered position during the feeding operation, but when this operation has been completed, the table will again be moved into its raised position by admitting pressure fluid to the cylinder 39 to effect movement of the piston 38 to the right. At this time the rollers 30 will be lowered. The raising of the table brings the rollers 3 and 4 into engagement with the pipe and lifts it off of the rollers 30. The operator will then actuate the clutches 13 and 14 to effect rotation of the rollers 3 and 4 in a direction to remove the threaded pipe from the barrel of the threading machine, after which the clutches will be again moved to neutral position to stop rotation of the rollers. This completes one cycle of the operation of the feeding and discharging mechanism. This cycle is repeated over and over again during the operation of the threading machine.

The object of lowering the roller table and raising the rollers 30, in order to support the pipe on the rollers 30 while it is being threaded, is to prevent the undue friction which would occur between the rotating pipe and the rollers 3 and 4, if the pipe were supported by the latter during the threading operation. It will be noted that the clutch mechanism and the driving connection between the same and rollers are mounted upon the roller table and consequently partake of the raising and lowering movements of said table. The universal joints 12 and 12ª between the pinion 9 and the clutch shaft 10 are provided for this purpose. It will be apparent that the rollers 3 and 4 may be driven by means independent of the threading machine, if desired, as by a separate motor.

The advantages of the invention arise from the provision of feeding and discharging mechanism which is entirely automatic in operation and enables material, such as pipes, to be handled quickly and with substantially no manual manipulation of the same.

I claim:

1. Feeding and discharging mechanism, comprising a roller table, a plurality of spaced rollers mounted on said table, means for rotating said rollers, a support at each side of said table, and a single transfer means adapted to transfer an article from the support at one side of said table to said rollers and to transfer said article from said rollers to the support at the other side of said table, substantially as described.

2. Feeding and discharging mechanism, comprising a roller table, a plurality of spaced rollers mounted on said table, means for rotating said rollers in either direction, a support at each side of said table, and transfer means adapted to both transfer an article from the support at one side of said table to said rollers and to transfer said article from said rollers to the support at the other side of said table in a single operative cycle, substantially as described.

3. Feeding and discharging mechanism, comprising a roller table, a plurality of spaced rollers mounted on said table, each of said rollers having a grooved periphery, a support at each side of said table, and a common transfer means adapted to transfer an article from the support at one side of said table to said rollers and to transfer said article from said rollers to the support at the other side of said table, substantially as described.

4. Feeding and discharging mechanism, comprising a roller table, a plurality of spaced rollers mounted on said table, a support at each side of said table, transfer means adapted to transfer an article from the support at one side of said table to said rollers and to transfer said article from said rollers to the support at the other side of said table and means for increasing the frictional engagement between the rollers and an article handled thereby, substantially as described.

5. Feeding and discharging mechanism, comprising a roller table, a plurality of spaced rollers mounted on said table, electro-magnetic means for increasing the frictional engagement between the rollers and an article handled thereby, means for supplying current to said electro-magnetic means, a support at each side of said table, and transfer means adapted to transfer an article from the support at one side of said table to said rollers and to transfer said article from said rollers to the support at the other side of said table, substantially as described.

6. Feeding and discharging mechanism, comprising a roller table, a plurality of spaced rollers mounted on said table, each of said rollers having a grooved periphery and certain thereof being magnetic whereby the frictional engagement between the rollers and an article handled thereby is materially increased, each of said magnetic rollers embodying a ring of non-magnetic material at the base of its groove, means for rotating said rollers, a support at each side of said table, and transfer means adapted to transfer an article from the support at one side of said table to said rollers and to transfer such article from said rollers to the support at the other side of said table, substantially as described.

7. Feeding and discharging mechanism, comprising a roller table, a plurality of spaced transversely extending rollers mounted on said table, a pair of longitudinally extending rollers arranged side by side in alignment wth said transversely extending rollers, means for rotating said transversely extending rollers, and means for raising and lowering said table and the rollers mounted thereon, said longitudinally extending rollers acting when the table is lowered as supporting means for the material being lowered, substantially as described.

8. Feeding and discharging mechanism, comprising a roller table, a plurality of spaced transversely extending rollers mounted on said table, a pair of longitudinally extending rollers arranged side by side in alignment with said transversely extending rollers, means for rotating said transversely extending rollers, means for raising and lowering said table and the rollers mounted thereon, a support at each side of said table, and transfer means adapted to transfer an article from support at one side of said table to said transversely extending rollers and to transfer said article from said rollers to the support at the other side of said table, substantially as described.

9. Feeding and discharging mechanism, comprising a roller table, a plurality of spaced rollers mounted on said table, means for rotating said rollers, a support at each side of said table, and transfer means adapted to transfer an article from the support at one side of said table to said rollers and to transfer said article from said rollers to the support at the other side of said table, said transfer means comprising a plurality of rocker arms adapted when rocked in one direction to raise said article off of said support at one side of said table and transfer it onto said rollers and when rocked in the opposite direction to raise said article off of said rollers and transfer it onto the support at the other side of said table, and means for rocking said arms in opposite directions, substantially as described.

10. Feeding and discharging mechanism, comprising a roller table, a plurality of spaced rollers mounted on said table, means for rotating said rollers, a supply rack at one side of said table inclined towards said table and provided with stops adjacent said table, a receiving rack at the other side of said table inclined away from said table, means associated with each of said racks for adjusting the elevation of the end thereof adjacent said table, and transfer means adapted to transfer an article from the supply rack to said rollers and to transfer said article from said rollers to said receiving rack, substantially as described.

11. Feeding and discharging mechanism, comprising a conveyor, a stationary support at each side of said conveyor, and transfer means comprising a curved arm adapted to transfer an article from the support at one side of said conveyor to said conveyor and to transfer said article from said conveyor to the support at the other side of said conveyor, substantially as described.

12. Feeding and discharging mechanism, comprising a conveyor, means for raising and lowering the same, and supporting rolls cooperating with said conveyor and serving when the conveyor is lowered to support the material previously supported by the conveyor, said supporting rolls having their axes substantially parallel to the line of travel of the material on said conveyor, substantially as described.

13. Feeding and discharging mechanism, comprising spaced supports, a conveyor between said supports, and transfer mechanism intermediate said supports, such transfer mechanism being operable upon movement in one direction for transferring an article from one of said supports to the conveyor and operable in the opposite direction for transferring a previously transferred article from the conveyor to the other support, substantially as described.

14. Feeding and discharging mechanism, comprising spaced supports, a conveyor between said supports, and transfer mechanism intermediate said supports, said transfer mechanism being operable upon movement in one direction for transferring an article form one of said supports to the conveyor and operable in the opposite direction for transferring a previously transferred article from the conveyor to the other support, there being an adjustable stop on one of said supports cooperating with said transfer means, substantially as described.

15. Feeding and discharging mechanism, comprising spaced supports, a conveyor between said supports, and transfer mechanism intermediate said supports, said transfer mechanism being operable upon movement in one direction for transferring an article from one of said supports to the conveyor and operable in the opposite direction for transferring a previously transferred article from the conveyor to the other support, there being means for raising and lowering said conveyor substantially as described.

16. Feeding and discharging mechanism, comprising spaced supports, a conveyor between said supports, and transfer mechanism intermediate said supports, said transfer mechanism being operable upon movement in one direction for tranferring an article from one of said supports to the conveyor and operable in the opposite direction for transferring a previously transferred article from the conveyor to the other support, there being means for raising and lowering said supports, substantially as described.

17. Feeding and discharging mechanism, comprising a roller table, a plurality of spaced transversely extending rollers mounted on said table, a pair of longitudinally extending rollers arranged side by side in alignment with said first mentioned rollers, and means for raising and lowering said table and the rollers mounted thereon, said longitudinally extending rollers acting when the table is lowered as supporting means for the material being handled, substantially as described.

In testimony whereof I have hereunto set my hand.

EDGAR H. WILSON.